UNITED STATES PATENT OFFICE.

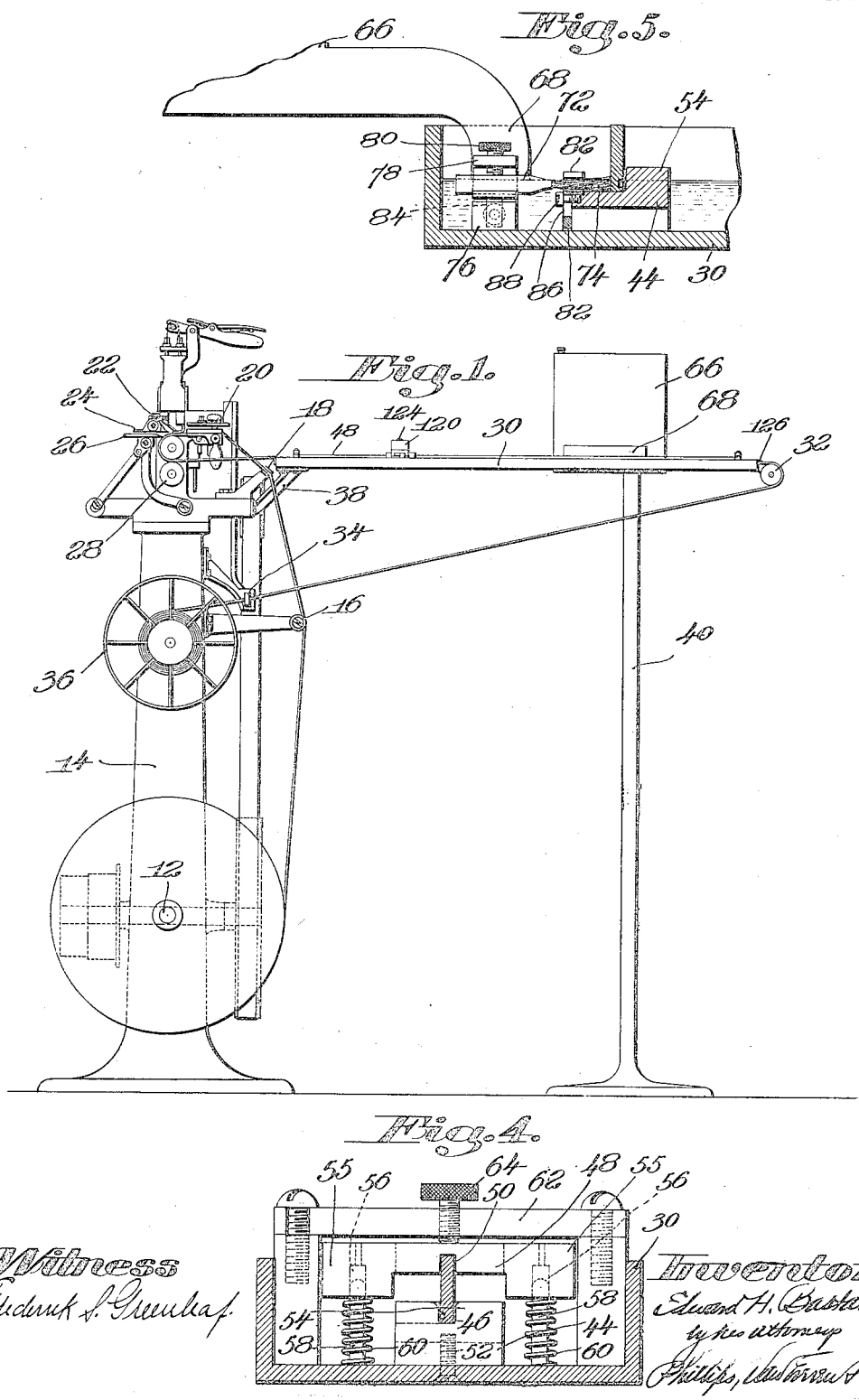

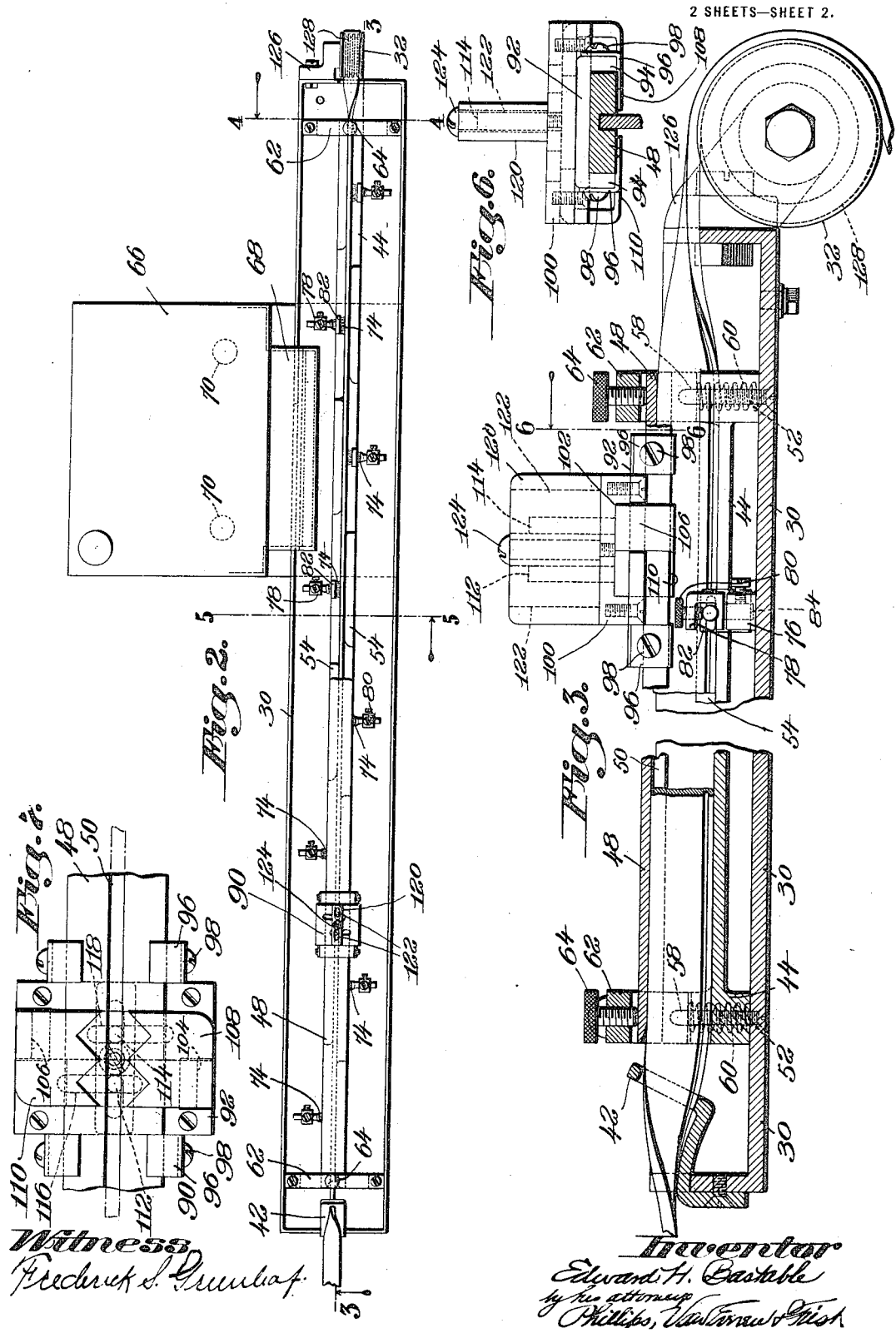

EDWARD H. BASTABLE, OF BOSTON, MASSACHUSETTS, ASSIGNOR TO UNITED SHOE MACHINERY COMPANY, OF PATERSON, NEW JERSEY, A CORPORATION OF NEW JERSEY.

MACHINE FOR PREPARING WELTING.

1,235,955.  Specification of Letters Patent.  Patented Aug. 7, 1917.

Application filed April 2, 1915.  Serial No. 18,703.

*To all whom it may concern:*

Be it known that I, EDWARD H. BASTABLE, a citizen of the United States, residing at Boston, in the county of Suffolk and State of Massachusetts, have invented certain new and useful Improvements in Machines for Preparing Welting; and I do hereby declare the following to be a full, clear, and exact description of the invention, such as will enable others skilled in the art to which it appertains to make and use the same.

This invention relates to machines for preparing welting to be used in the manufacture of welt shoes.

In the manufacture of welt shoes the welting is usually prepared by grooving and beveling it, and then the prepared welting is hanked or reeled. Just prior to attaching the prepared welting to a shoe it is moistened and tempered, principally that it may be more readily penetrated by the fastenings or the fastening inserting devices, and for other reasons well recognized in the shoemaking art. In moistening the prepared welting the hank or reel is usually placed in a vessel of water or the welting is drawn through a vessel of water in passing to the fastening point. Welting moistened in this manner is wetted over its entire surface, and when attached to the shoes the moist welt will come in contact with the uppers. This is particularly objectionable in the manufacture of shoes having uppers of the lighter colors, since the uppers are often stained or otherwise injured by the contact therewith of the moist welt.

The primary object of the present invention is to provide a welt moistening and tempering device for preparing welting for the welt sewing operation such that the prepared welting will have the advantageous qualities of the usual moistened and tempered welting and yet may be attached to shoes having light colored uppers without risk of staining or otherwise injuring them. In accordance with this object, one feature of the invention contemplates the provision of a welt moistening and tempering device for moistening a definite width of the welting such that when it is attached to the shoe no moisture will come in contact with any visible part of the shoe upper.

In addition to preventing the staining of the upper, a welting moistened and tempered only for a portion of its width has many advantages over a welting moistened over its entire surface. Weltings which are not dyed with fast colors will have the colored surfaces damaged and altered by being moistened over the entire surface, but when only the edge of a welting which is to receive the seam is tempered, the wetting operation does not injure any visible part of the welting. In the manufacture of welting different grades of leather are selected from the various sections of the hide and the leather is treated during its curing and tanning operations with certain solutions in order to give the different grades of welting a uniform appearance, body and texture. The treating solutions are either soluble or chemically altered by water so that when a welting is moistened over its entire surface it shrinks and curls up. Also, the welting which has once been moistened and dried is difficult to get into proper temper again. However, by wetting only one edge of the welting it may be attached to the shoe and the largest portion thereof remain in its original condition. After thus being attached to the shoe it may be easily tempered for a subsequent operation. Further, certain classes of welting when wet over the entire surface lose their rigidity and body and cannot be properly manipulated by the welt guide of the welt sewing machine in order to place the seam in the groove of the welting. By wetting this class of welting so as to temper only the portion necessary for placing the seam in the welting, the rigidity in the body of the welting is preserved so that it can be properly attached to the shoe. In the embodiment of the invention hereinafter described the wetting device consists of an elongated tank in which the moistening liquid can be adjusted to a predetermined level. The tank contains a top and bottom guide so that the welting is conducted edgewise in a definite position through the tank, and the water level determines the width of the wetting. The wetting device is illustrated as embodied in a welt grooving and beveling machine, and although it has special application in this machine, the device obviously could be used for wetting the welt at any time during the manufacture of the welt, or any time subsequent to its manufacture and before it is attached to the shoe.

Another object of the invention is to provide a welt moistening and tempering device for a welt grooving and beveling machine such that the welting is grooved and beveled, and then immediately moistened while the leather is freshly cut. In accordance with this object another feature of the invention contemplates the provision in a welt grooving and beveling machine of a moistening device so situated in the machine that the welting is immediately led from the grooving and beveling knives to the moistening device. In the construction hereinafter described the inlet end of the moistening tank is situated immediately behind the feed rolls of the welt beveling and grooving machine, so that as the welting is cut by the knives of the machine it is conducted into the moistening liquid. This is especially advantageous because it gives the moistening liquid an opportunity to enter into the pores of the leather when they are freshly opened and before there is any oxidation of the surface, and also before there has been any surface modification, due to evaporation or chemical changes. The groove on the flesh side of the welting, and the bevel on the grain side of the welting, allow moisture to work in from both sides to secure an efficient penetration of the moistening liquid so that the welt is in an excellent condition for the sewing operation. By embodying the wetting device in the welt grooving and beveling machine, the welting is efficiently moistened for the sewing operation without additional cost of labor or delay of time in the manufacture.

A further feature of the invention contemplates the provision in a welt grooving and beveling machine of a moistening device and a winding mechanism so arranged that the welting coming from the grooving and beveling knives is conducted through the moistening device and then wound on a reel to permit the welting to temper.

Further features of the invention consist of certain constructions, arrangements and combinations of parts hereinafter described and claimed, the advantages of which will be obvious to one skilled in the art, from the following description. In the drawings illustrating the invention in the best form at present known to the inventor, Figure 1 is a front elevation of a welt grooving and beveling machine embodying applicant's welt wetting and tempering device; Fig. 2 is a plan view, partly broken away, of the improved welt wetting device; Fig. 3 is a vertical section of the welt wetting device taken on the line 3—3 of Fig. 2; Fig. 4 is a section of the welt wetting device taken on the line 4—4 of Fig. 2; Fig. 5 is a section of the welt wetting device taken on the line 5—5 of Fig. 2, showing the water leveling device; Fig. 6 is a section taken on the line 6—6 of Fig. 3, showing an elevation of the device for threading the welting through the guides of the welt moistening tank; and Fig. 7 is a bottom plan view of the welt threading device.

The unprepared welting, in the form of a tight roll, is placed between a pair of disks upon a shaft 12 mounted on the base 14 of a welt grooving and beveling machine. One end of the welting is led from the roll over guides 16 and 18 on the machine frame, to the guide trough 20. After passing through the guide trough the welt is acted upon by a grooving knife 22, skiving knife 24 and slashing knife 26 as it is carried forward by a pair of feed rolls 28. Immediately after going between the feed rolls the welting passes through a wetting device 30, thence over a guide roll 32 down through a reel feeding device 34 and is wound in a spiral form upon a reel 36. The welt grooving and beveling machine illustrated in the drawings is substantially the same as the welt grooving and beveling machine shown and described in the patent to Stanbon No. 1,115,123, and reference is hereby made to said patent for a detailed description of the operation and construction of parts of said machine.

The welt wetting device 30 (Figs. 1, 2, 3 and 4) consists of a metallic tank supported at its inlet end upon a bracket 38 mounted upon the frame of the welt grooving and beveling machine, and supported at its exit end upon a stand 40. The wetting tank is provided at its inlet end with a welt positioning device 42 which acts to twist the welting coming from the feed rolls through an angle of 90° and place it in an edgewise position ready to pass through the guides in the wetting tank. The welting is maintained in an edgewise position while passing through the tank by means of a lower guide 44 that has a groove 46 for guiding the grooved and beveled edge of the welting and a top guide 48 having a slot 50 for guiding the upper edge of the welting. The bottom guide 44 is permanently attached to the tank 30 by means of screws 52 and has a series of abutments 54 alternately arranged throughout the length of the guide and on opposite sides. The inner edges of these abutments form the groove 46 for guiding the grooved and beveled edge of the welting. The top guide 48 has a pair of arms 55 at each end which are provided with slots 56 that fit over pins 58 mounted in the bottom of the tank. The guide 48 is yieldingly supported by springs 60 surrounding the pins 58. In the tank adjacent each end of the top guide is mounted an arm or cross bar 62 which carries an adjusting screw 64. This adjusting screw is adapted to bear against the top guide so that the guide may be adjusted toward and away from the bottom guide in order to set the guides for various sizes of welting. In wetting the various styles of welting the top guide is adjusted so that the distance between the bottom of the groove 46 and slot 50 is substantially the width of the welting. The grooved and beveled edge of the welting is therefore held down against the bottom of the groove 46 and a uniform width of wetting will be insured.

The wetting tank and bottom guide 44 are arranged in a level position and the wetting liquid is maintained at a predetermined level in the tank by means of a barometric leveling tank 66 which is supported on the stand 40. The level of the solution in the tank is maintained uniform by means of a nozzle 68 (Fig. 5) on the front end of the barometric tank. This nozzle may be adjusted to vary the level of the liquid by means of adjusting screws 70. The water level shown in dotted lines, Fig. 5, will vary with the position of the exit end 72 of the nozzle 68.

The welting as it enters the tank is more or less repellent to a moistening liquid or water, and it has been found desirable to employ brushes to work the liquid into the pores of the welting. These brushes 74, one for each abutment 54, are mounted on stands 76 fastened to the bottom of the tank at the opposite sides of the lower guide 44. Due to the alternate arrangement of the brushes on opposite sides of the lower guide, the brushes operate on both sides of the welting. Each brush which may consist either of metallic or fiber bristles is mounted in a yoke 78 (Figs. 3 and 5) on the stand 76 by means of a set screw 80 and may be adjusted toward and from the abutment to vary the pressure of the brush on the welting to control the character of wetting. The brushes are positioned so as to act upon substantially the portion of the width of the welting to be wet and the bristles of each brush are confined to this area by means of a shield 82 which has an adjustable mounting upon the side of the lower guide 44. In order to vary the width of contact of the brush in wetting the welting, the yoke 78 is provided with a stem 84 which is vertically adjustable in the stand 76, so that the brush may be raised and lowered to agree with the various levels of the water in the moistening tank 30. When the brush is adjusted vertically for different widths of wetting the shield 82 may be vertically adjusted by means of the slot 86 and screw 88 so that the bristles of the brush will be confined to the specific area to be wetted.

When starting a new roll of welting through the beveling and grooving machine the front end of the welting is pushed through the positioning device 42 into the forward end of the guides 44 and 48 and is then carried through the guides by means of a threading device 90 which is slidably mounted upon the top guide 48 so as to be freely movable between the arms 62 at the opposite end of the guide. The welt threading device (Figs. 2, 3, 6 and 7) consists of a main body plate 92 which has a pair of lugs 94 at each end turned down to fit over the top guide 48. Around these lugs are placed clips 96 which are held by screws 98 and these securely hold the threading device upon the top guide so that it may slide freely along the guide. Mounted on the top plate 92 is a guide plate 100 which is provided with a slot 102 to receive movable arms 104 and 106. On the movable arms 104 and 106 are mounted jaws 108 and 110 which are bent around into parallel relation with the arms so that the jaws work across the under face of the guide 48. The slidable arms 104 and 106 are provided with pins 112 and 114, respectively, which project from the face of the arm through slots 116 and 118, respectively, in the guide plate 100. A turn buckle 120 having a pair of slots 122 to fit over the pins 112 and 114 is rotatably mounted by means of a screw 124 on the upper face of the guide plate 100. With this structure a rotation of the turn buckle 120 tends to move the pins 112 and 114 in opposite directions and thereby draws the jaws toward or away from one another. When the welting is pushed through the positioning device into the forward end of the guides, the threading device can be actuated to grip the welting and be drawn along the top guide to thread the welting between the guides. After leaving the guides the welt is twisted through an angle of 90° and passes over the roller 32 mounted on a bracket 126 on the end of the wetting tank. The roller 32 (Fig. 2) consists of a series of disks 128 which are spaced apart to prevent any liquid entrained by the welting from being spread over the face of the roller and wetting the entire surface of the welting. The solution coming over the roller with the welting runs down between the disks 128 and is therefore confined to the moistened area of the welting. From the roller 32 the moistened welting passes through the reel feeding device 34 and is wound in a spiral coil upon the reel 36. With the welting in a coil the moisture has an opportunity to temper the welting without evaporating. By winding the moistened welting into a tight roll the welting could be held in a tempered condition for a long period of time.

While the particulars of construction herein set forth are well suited to one form of the invention it is not to be understood that these particulars are essential since they may be variously embodied within the skill of an artisan without departing from the true scope of the actual invention as defined by the following claims:

1. A welt wetting device comprising means for positioning a welt, and means for applying a moistening liquid to only the grooved edge of the positioned welt in sufficient quantity to temper the welt for a subsequent sewing operation.

2. A welt wetting device comprising means for guiding a welt, and means for applying sufficient liquid to less than the width of the welt as it is guided by said means to bring it into temper for a subsequent sewing operation.

3. The combination with a welt wetting device of means for conducting the welt through the wetting device, and means for winding the welt into a close roll for tempering.

4. A welt wetting device comprising a tank for holding a moistening liquid, and means for guiding a welting through the tank into contact with said liquid in such a manner that the grooved edge only of the welting is moistened.

5. A welt wetting and tempering device comprising a tank for holding a moistening liquid, means for guiding a welt through the tank into contact with said liquid in such a manner that the grooved edge only of the welt is moistened, and means for winding the moistened welt into a close roll for tempering.

6. A welt wetting device comprising a tank for holding a moistening liquid, a guiding device in the tank for guiding the welt in a predetermined path in said liquid as it is drawn through the tank, and means for adjusting the level of the moistening liquid with reference to the guiding device in order to temper a predetermined portion of the width of the welt.

7. A welt wetting device comprising a tank for holding a moistening liquid, and guides for conducting the welt through the tank in such a manner that less than the width of the welt will be immersed in said liquid.

8. The combination of, a welt moistening tank for holding moistening liquid, guiding means in the tank for the welt, for positioning the welt in said liquid, means for drawing the welt through the tank and guide, and means for working the moistening liquid into the welt.

9. A welt grooving and beveling machine, having, in combination, welt grooving and beveling mechanism, welt feeding mechanism, and a welt wetting device for wetting the welt as it is grooved and beveled to temper it for an inseam sewing operation.

10. A welt grooving and beveling machine, having, in combination, welt feeding mechanism, a wetting device for wetting a definite width of the welt, and means to wind the wetted welt into a roll to temper for a subsequent operation.

11. A welt grooving and beveling machine, having, in combination, welt grooving and beveling mechanism, welt feeding mechanism, and means to moisten only the beveled and grooved edge of the welt.

12. A welt grooving and beveling machine, having, in combination, welt grooving and beveling mechanism, welt feeding mechanism, a tank for holding a moistening liquid, and means to conduct a welt through the moistening liquid in such a manner that only a definite portion of the width of the welt will be immersed in said liquid.

13. A welt grooving and beveling machine, having, in combination, welt grooving and beveling mechanism, welt feeding mechanism, means for moistening the grooved and beveled welt, and means to wind the moistened welt into a roll to temper.

14. A welt wetting device comprising a tank for a moistening liquid, means to guide a welt through the moistening tank with the plane of the face of the welt at an angle to the horizontal, and means to maintain a predetermined level of a moistening liquid in the tank, said guiding means being arranged with relation to the liquid level so that less than the width of the welt will be moistened.

15. A welt wetting device comprising a tank for holding a moistening liquid, means for conducting a welt through the moistening tank in such a manner that only a portion of the width of the welt will be immersed in said liquid, and means for acting on substantially the immersed portion of the welt for working the moistening liquid into the welt.

16. A welt wetting device comprising a tank for holding a moistening liquid, means to conduct a welt through the moistening tank in such a manner that only a portion of the width of the welt will be immersed in said liquid, means for maintaining a predetermined level of moistening liquid in the tank, and mechanism for adjusting the leveling means for wetting different widths of the welt.

17. A welt wetting device comprising a tank for holding a moistening liquid, means to conduct a welt through the moistening tank, in such a manner that only a portion of the width of the welt will be immersed in said liquid, mechanism for working the moistening liquid into the welt, and means to adjust the liquid level and the mechanism for working the moisture into the welt in order to wet the welt different distances from the bevel edge.

18. A welt wetting device comprising a tank for holding a moistening liquid, a guide in the bottom of said tank, means for holding the moistening liquid at a predetermined level above the guide, and a cover guide for the welt to hold an edge of the welt against the bottom guide.

19. A welt wetting device comprising a tank for holding a moistening liquid, means for conducting a welt through the tank, a device in the tank for rubbing against the welt to work the liquid into the welt, and means to vary the pressure of the rubbing device against the welt to vary the character of wetting.

20. A welt wetting device comprising a tank for holding a moistening liquid, means for pulling the welt through the tank, a guide in the bottom of the tank having a plurality of abutments for guiding the welt, and a plurality of rubbing devices coöperating with said abutments for rubbing opposite sides of the welt to work moistening into the welt.

21. The combination of, a welt moistening tank, a guide for an edge of the welt in the bottom of the tank, a guide above the first mentioned guide for the other edge of the welt, and means for relatively adjusting the guides for wetting different sizes of welt.

22. The combination of, a wetting tank, a deflector for positioning a welt, a top and a bottom guide for the welt, and a threading device on the top guide for threading the welt through the guides.

23. The combination of, a wetting tank for holding a moistening liquid, means for positioning a welt in said liquid in such a manner that only a predetermined portion of the width of the welt will be tempered, and an annularly grooved guide roll for supporting the welt at the exit end of the tank.

24. The combination of, a wetting tank, a top and a bottom guide for the welt, and a threading device slidable on the top guide and having a pair of jaws operable to grip the welt so that it may be drawn through the guides.

25. A welt wetting device comprising means for simultaneously applying a moistening liquid to less than the width of the welt to each side of the welt, and means for positioning and guiding the welt as it passes toward and from said device.

EDWARD H. BASTABLE.

Witnesses:
ELMER E. RUNESTROM,
ALFRED A. FERRY.